United States Patent [19]

Sato

[11] 4,378,191
[45] Mar. 29, 1983

[54] CARGO HANDLING LOADER FOR PALLETS

[76] Inventor: Masataro Sato, 26-go, 28-ban, 2-chome, Fukuoka-cho, Takamatsu-shi, Kagawa-ken, Japan

[21] Appl. No.: 143,872

[22] Filed: Apr. 25, 1980

[30] Foreign Application Priority Data

May 1, 1979 [JP] Japan .................. 54-58475

[51] Int. Cl.³ .............. B60P 1/00; B66F 9/00
[52] U.S. Cl. .................. 414/540; 254/2 C; 280/43.12
[58] Field of Search ........... 414/540; 280/43.12, 280/43.13, 43.16; 254/2 R, 2 C

[56] References Cited

U.S. PATENT DOCUMENTS

| | | | |
|---|---|---|---|
| 1,115,796 | 11/1914 | Fahnestock | 254/2 C |
| 1,844,585 | 2/1932 | Manley | 280/43.12 X |
| 2,358,957 | 9/1944 | Barrett | 280/43.12 X |
| 2,488,521 | 11/1949 | Barrett | 280/43.12 |
| 2,598,151 | 5/1952 | Warshaw | 280/43.12 X |
| 2,940,767 | 6/1960 | Quayle | 280/43.12 |
| 3,091,476 | 5/1963 | Blake | 280/43.13 |
| 4,103,795 | 8/1978 | Miller | 280/43.13 X |

Primary Examiner—John J. Love
Assistant Examiner—L. E. Williams
Attorney, Agent, or Firm—Armstrong, Nikaido, Marmelstein & Kubovcik

[57] ABSTRACT

A cargo handling loader for pallets which is portable and capable of easily transporting a pallet carrying a cargo by a manual force. The loader comprises a loader body including a manipulation frame and a cargo receiving frame extended substantially horizontally from one end of the manipulation frame and having an elongated form so that it may be inserted into the cavity of a pallet; a front wheel supporting arm rotatably carrying a front wheel and secured to the cargo receiving frame for pivotal movement in a vertical plane; and a rear wheel supporting arm rotatably carrying a rear wheel and secured to the cargo carrying frame for pivotal movement in a vertical plane. The manipulation frame rotatably carries a manipulation member which in turn is connected to the front and rear wheel supporting arms by connecting links. The manipulation member is connected to a handle which projects outward from the manipulation frame and is adapted, as the handle is manipulated, to swing with respect to the manipulation frame to cause pivotal movement of the front and rear wheel supporting arms in vertical planes thereby to raise and lower the loader body. By using this loader, a pallet carrying a cargo can be transported easily by manual force, irrespective of whether the pallet is a single-sided or double-sided, and to place successive pallets in close contact with each other to permit an efficient use of the area for storing the cargo.

8 Claims, 7 Drawing Figures

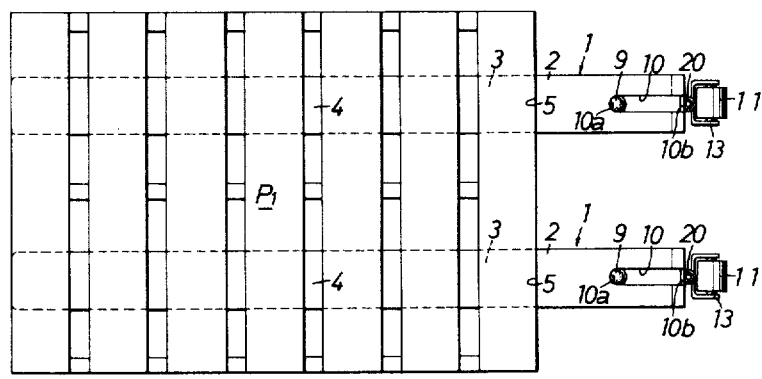
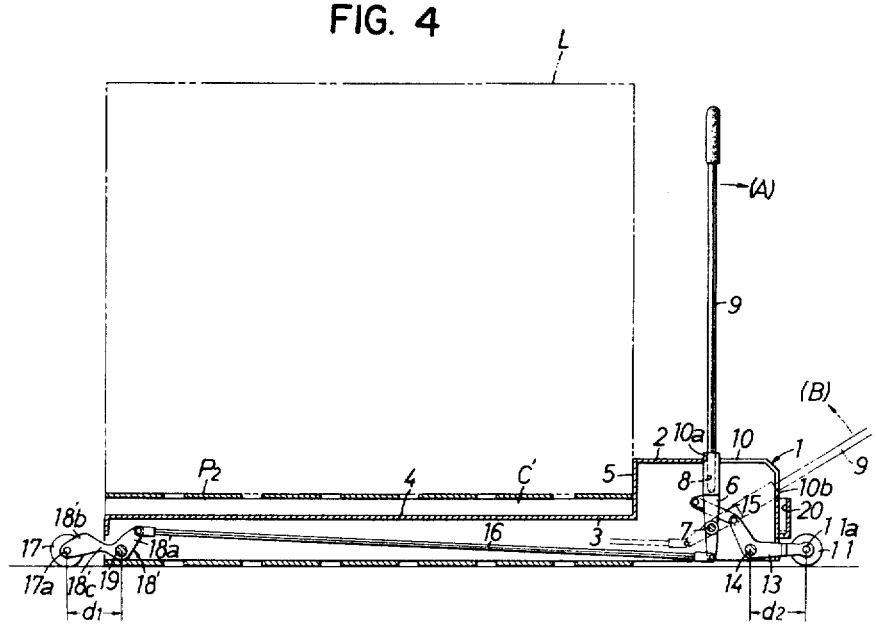

CARGO HANDLING LOADER FOR PALLETS

BACKGROUND OF THE INVENTION

1. Field of the Invention

The present invention relates to a loader for pallets used in cargo handling and, more particularly, to a portable loader having a simplified construction and capable of easily transporting a pallet carrying the cargo.

2. Description of the Prior Art

Various cargo handling machines such as fork lifts, pallet transporter and so forth have been used in transportation of pallets mounting cargoes, as well as in the loading and unloading of the pallet. All of these known machines, however, are constructed as mobile vehicles having engines. These machines, therefore, have large size and weight which make these machines difficult to be moved or transported by manual force. Thus, these machines in some cases are not serveable, as in the cargo handling on a rail-road freight car or in a narrow space in warehouse.

SUMMARY OF THE INVENTION

Under these circumstances, the present invention aims as its first object at providing a cargo handling loader for pallets having a simplified construction and reduced weight and, hence, capable of being lifted or transported by a worker so as to be used on the bed of a vehicle or in narrow warehouse.

It is a second object of the invention to provide a cargo handling loader for pallets capable of performing a stable transportation of the cargo and placing a subsequent or following pallet in close proximity of a preceding pallet carrying the cargo and transported just before the following pallet, without leaving substantial clearance between these pallets, irrespective of whether a single or double-sided pallet is used.

To these ends, according to the invention, there is provided a cargo handling loader for pallets comprising: a loader body including a manipulation frame and an elongated cargo receiving frame extending laterally from one end of said manipulation frame so as to be insertable into a cavity of a pallet; a front wheel supporting arm rotatably carrying a front wheel and supported by said cargo receiving frame for pivotal movement in a vertical plane; a rear wheel supporting arm rotatably carrying a rear wheel and supported by said manipulation frame for pivotal movement in a vertical plane; and mechanism connected with said front and rear wheel supporting arms for operating them such that said front and rear arms are rotated around their pivot connections between a horizontal position and an upright position to raise and lower said loader body.

In the use of the loader of the invention having the described construction, the cargo receiving frame of the loader body is inserted into the pallet and, then, the mechanism for operating the front and rear wheel supporting arms is actuated to raise the loader body together with the pallet mounted thereon. In this state, the loader body is supported by the front and rear wheels of the loader and, accordingly, can easily be moved simply and easily by manual force solely, without necessitating any other assisting power. Since the driving power source such as an engine is eliminated, the loader of the invention has a simple and sturdy construction with reduced chance of troubles and can perform the work in quite a safe way.

According to an aspect of the invention, the front wheel supporting arm is pivoted to the cargo receiving frame at its front end so that the front wheel is projected forwardly from the front end of the cargo receiving frame. This arrangement is particularly suited for use with double-sided pallets each having a pair of pallet receiving surfaces on the opposite, upper and lower sides, in which surfaces there is no opening large enough for permitting the front wheel to project outward therethrough.

According to another aspect of the invention, the front wheel supporting arm is pivoted to the cargo supporting frame at a location spaced inwardly from the front end thereof so that the front wheel does not project forwardly from the front end of the cargo receiving frame. This arrangement is usually used with single-sided pallets each having a pallet receiving upper surface and a ground-contacting lower surface which is provided with at least one opening for permitting the front wheel to project outward therethrough.

According to still another aspect of the invention, the loader is provided with a tilting mechanism for holding, when the loader body is raised, the loader body at such a state that the loader body is inclined downwardly from the front end of the cargo receiving frame toward the rear end thereof closer to the manipulation frame. It is, therefore, possible to stably transport the cargo by the front and the rear wheels while placing the center of gravity of the cargo at a position near the manipulation frame, in the raised state of the loader body. The shifting of the center of the cargo gravity to a point near the manipulation frame relieves the front wheel from the load, so that the front wheel can be steered comparatively easily in relation to the pallet which has been transported and placed already, so that the new pallet can be landed easily in close proximity of the preceding pallet without substantial clearance therebetween to eliminate dead space of placement between successive pallets.

The above and other objects, features and advantages of the invention will be apparent from the following detailed description of the invention when read in conjunction with the accompanying drawings which illustrate a few presently preferred embodiments of the invention.

BRIEF DESCRIPTION OF THE DRAWINGS

FIGS. 1 to 3 are illustrations of a loader in accordance with an embodiment of the invention used for the transportation of single-sided pallet in which:

FIG. 1 is a longitudinal sectional view of the whole portion of the loader with its loader body in the lowered position;

FIG. 2 is a longitudinal sectional view of the loader with its loader body in the raised position; and FIG. 3 is a plan view of the loader shown in FIG. 1;

FIGS. 4 to 7 are illustrations of the loader of the invention applied to the transportation of a double-sided pallet in which:

FIG. 4 is a longitudinal sectional view of the loader with its loader body in the lowered position;

FIG. 5 is a plan view of the loader shown in FIG. 4; and

FIGS. 6 and 7 are side elevational sectional view of a part of the loader in the state of grounding of the double-sided pallet in the close proximity of a preceding pallet.

DESCRIPTION OF THE PREFERRED EMBODIMENTS

Figure 1:
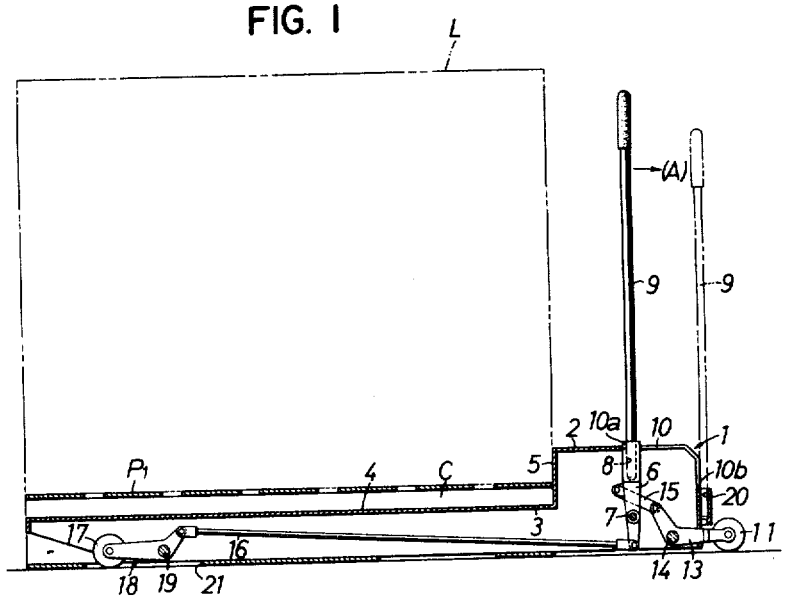
Figure 2:
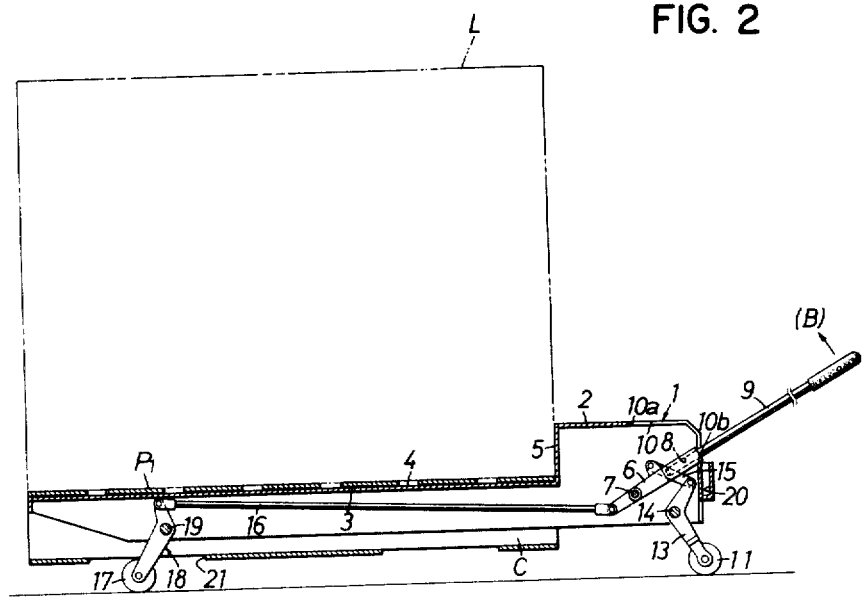
Figure 5:
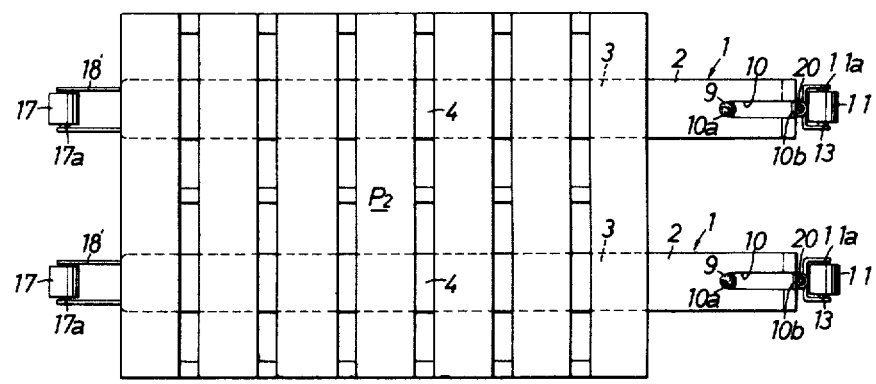
Figure 6:
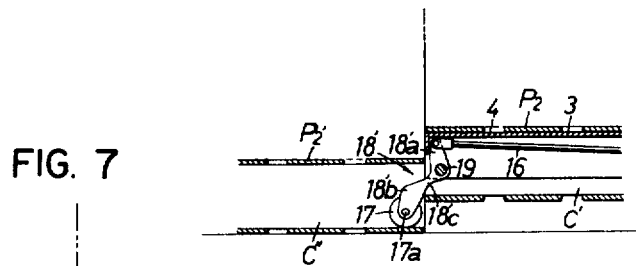
Figure 7:
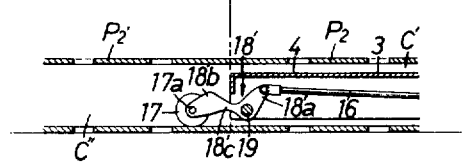

Hereinafter, preferred embodiments of the invention will be described with specific reference to the accompanying drawings. Referring first to FIGS. 1 to 3 showing a first embodiment of the invention suitable for use in transportation of a single-sided pallet $P_1$, the loader of this embodiment has a loader body 1 including a manipulation frame 2 and an elongated finger-like cargo receiving frame 3 extending substantially horizontally from one end of the manipulation frame 2. The cargo receiving frame 3 has a substantially U-shaped cross-section opened at its lower side. A pallet contacting surface 5 is formed at a portion between the upper cargo receiving surface 4 of the cargo receiving frame 3 and the aforementioned manipulation frame 2. The pallet contacting surface 5 stands substantially upright from the cargo receiving surface 4. The cargo receiving frame 3 is so shaped and sized as to be able to be received by the cavity or clearance C formed in the single-sided pallet $P_1$.

A manipulation member 6 is rockably supported at its intermediate portion by the manipulation frame as at 7. A handle-receiving hole 8 is formed at an upper part of the manipulation member 6, so as to extractably receive a handle 9. An opening 10 constituted by an elongated slot is formed continuously in the top and rear wall of the manipulation frame 2.

The upper end portion of the manipulation member 6 extends upward through the opening 10. At the same time, a rear wheel supporting arm 13 carrying a rear wheel 11 which may be a caster is rotatably attached to the manipulation member as at 14 for vertical pivotal movement. A connection link 15 is connected by means of pins between the base end portion of the rear wheel supporting arm 13 and the intermediate portion of the manipulation member 6. Also, a connecting rod 16 is connected at its one end to the lower end of the manipulation member 6 by means of a pin. The connecting rod 16 extends forwardly through the cargo receiving frame 3 along the length of the latter, and the other end of the connecting rod 16 is connected by a pin to the base portion of a front wheel supporting arm 18 which is rotatably secured as at 19 to the front end of the cargo receiving frame 3 of the loader body 1 for vertical pivotal movement. A front wheel 17 is rotatably secured to the end of this front wheel supporting arm 18.

Therefore, as the handle 9 is swung in the direction of arrow A as viewed in FIG. 1, the rear wheel supporting arm 13 is rotated clockwise through the connection link 15 to stand upright and, at the same time, the connecting rod 16 is pushed to the left to cause a counter-clockwise rotation of the front wheel supporting arm 18 to make the latter stand upright.

A cylindrical handle holder 20 opened at its upper end is formed in the base portion of the loader body 1. The handle 9 extracted from the hole 8 of the manipulation member 6 is received at its lower end by the handle holder 20, so that it can be held substantially in vertical posture as shown by a one-dot-and-dash line in FIG. 1.

The first embodiment of the invention having the construction heretofore described operates in a manner explained hereinunder.

Usually, the loader of the invention is used in a pair, for handling one single-sided pallet $P_1$ loaded with a cargo. As will be seen from FIGS. 1 and 3, the cargo receiving frames 3 of a pair of the loaders are inserted into the clearance C of the single-sided pallet $P_1$. Subsequently, the handle 9 is swung in the direction of arrow A in FIG. 1 and is then tilted in a manner shown in FIG. 2. In consequence, both of the front and rear wheel supporting arms 18, 13 are made to stand upright and the front wheels 17 are projected downward from lower openings 21 of the single-sided pallet $P_1$ to lift the pallet $P_1$ above the ground together with the cargo receiving frame 3. In this state, the pallet $P_1$ is supported by the front and rear wheels 17, 11 and can be transported in quite a stable manner.

Then, as the handle 9 is swung in the direction of arrow B in FIG. 2, the supporting arms 18, 13 for front and rear wheels pivot to take horizontal positions to permit the single-sided pallet $P_1$ to be grounded. The range or stroke of the swinging of the handle 9 is limited by the front and rear edges 10a, 10b of the opening 10 which abut against the upper outer peripheral portion of the manipulation member 6.

FIGS. 4 to 7 in combination show another embodiment of the invention applied to for the transportation of a double-sided pallet $P_2$. In these Figures, the same reference numerals are used to denote the same parts or members as those of FIGS. 1 to 3 showing the first embodiment.

The double-sided pallet $P_2$ does not have a lower opening such as that 21 of the first embodiment through which the front wheel 17 is projected downward. Therefore, the loader of the second embodiment is constructed such that front wheel 17 and the front wheel supporting arm 18' supporting the former are projected for vertical swing outwardly from the end of the double-sided pallet $P_2$ when the cargo receiving frame 3 is inserted into the pallet $P_2$.

More specifically, each of a pair of front wheel supporting arms 18' as a whole has a form like an inversed S and is pivotally secured at its intermediate portion to the front end portion of the cargo receiving frame 3 as at 19. The front wheel supporting arm 18' has a rear arm portion 18'a extending upward from the pivot point 19 and a front arm portion 18'b extending forwardly from the pivot point 19. The rear arm portion 18'a is pivoted to the front end portion of the connecting rod 16 whereas the front arm portion 18'b rotatably carries the front wheel 17 at its front end portion. A narrowed region 18'c is formed at an intermediate portion of the inversed S-shaped front wheel supporting arm 18'. This narrowed region permits, when a plurality of pallets are to be placed in the close proximity of each other, the front wheel 17 of the loader carrying one pallet to smoothly come into another pallet which has already been transported and placed on the ground to bring the opposing ends of two pallets into close contact with each other. Other portions of this embodiment than specifically mentioned above are materially identical to those of the first embodiment shown in FIGS. 1 to 3.

In FIGS. 4 to 7, the distance $d_1$ between the axis 17a of rotation of the front wheel 17 and the shaft 19 is selected to be equal to the distance $d_2$ between the axis 11a of rotation of the rear wheel 11 and the shaft 14. It is, however, possible to select the former to be greater than the latter. In such a case, the loader body 1 can be held in such an inclination that the front end of the cargo receiving frame 3 is maintained higher than the rear end thereof adjacent the manipulation frame 2 when both front and rear wheel supporting arms 18' and 13 are in upright positions.

In operation, for lifting a double-sided pallet $P_2'$ the cargo receiving frames 3 of a pair of the loaders are inserted into the clearance C' of the pallet $P_2$. Subsequently, the handle 9 is swung in the direction of an arrow A to rotate the manipulation member 6 in a clockwise direction to the position as indicated in FIG. 4 by the dot and dash line so that the rear wheel supporting arm 13 is made to stand upright through the action of the connection link 15 while the connecting rod 16 is pushed forwardly to rotate the front wheel supporting arm 18' counter-clockwise to an upright position.

If the distance $d_1$ between the axis 17a of rotation of the front wheel and the shaft 19 is greater than the distance $d_2$ between the axis 11a of rotation of the rear wheel and the shaft 14, the front end of the cargo receiving frame 3 of the loader body 1 is held at a level higher than that of the rear end of the same, so that the double-sided pallet $P_2$ is lifted together with the cargo receiving frame 3, and the cargo L can be stably transported by means of the front and the rear wheels 17, 11 with its center of gravity applied to a point nearer to the manipulation frame 3 than to the front end of the cargo receiving frame 3.

In order to make it possible to ground the double-sided pallet $P_2$ in close proximity of or in contact with another double-sided pallet $P_2'$ which has already been transported and placed on the ground, the front wheel 17 of each loader is inserted into the cavity C" of the stationary pallet $P_2'$. In this case, the front wheel supporting arm 18' is shaped to have a form like an inversed S and is provided with a narrow region 18'c formed at that portion of the front arm portion 18'b which just projects forwardly from the front end of the cargo receiving frame 3 when the loader body 1 is in the raised position. Therefore, the front arm portion 18'a is never interfered by the adjacent upper edge of the stationary pallet $P_2'$. It is thus possible to smoothly move the front wheel 17 of the loader into the cavity C" of the stationary pallet $P_2'$ to bring the front end of the transported pallet $P_2$ into close contact with the adjacent end surface of the pallet $P_2'$.

Thereafter, as the handle 9 is swung in the direction of arrow B in FIG. 4, the front and rear wheel supporting arms 18', 13 are rotated to the horizontal positions to ground the double-sided pallet $P_2$ in close contact with the pallet $P_2'$.

The mechanism for holding the loader 1 at the forward and downward inclination may be constituted by means of a hydraulic cylinder, screw, lever or the like means, instead of selecting the larger length of the front wheel supporting arm 18' than the rear wheel supporting arm 13 as referred to above.

Although the loader of the invention has been described to work in a pair, this is not exclusive and a single loader can work sufficiently when the weight of the cargo is small. It is also possible to use three or more loaders at a time for transporting a cargo having a large weight.

Further, the mechanism for operating the front and rear wheel supporting arms 18, 18' and 13 may be replaced by any appropriate hydraulically, pneumatically, or electrically operated means.

What is claimed is:

1. A portable pallet loader having no power drive means comprising: a loader body having a manipulation frame and a cargo receiving frame extending horizontally from one end of said manipulation frame and being integral therewith, said cargo receiving frame being formed of a single elongated plate member so as to be insertable into a pallet cavity, said loader body being open at its bottom surface so as to reduce its weight; a front wheel supporting arm rotatably carrying a ground-engageable front wheel and being mounted on said cargo receiving frame for vertical pivotal movement; a rear wheel supporting arm rotatably carrying a ground-engageable rear wheel and being mounted on said manipulation frame for vertical pivotal movement; a link mechanism for operatively connecting between said front and rear wheel supporting arms for coordinated movements thereof; a handle member detachably connected to said link mechanism and being manually operated to pivot said front and rear wheel supporting arms to thereby raise and lower said loader body; said manipulation frame having an opening through which said handle member extends when connected to said link mechanism, said opening having peripheral edges adapted to abut against said handle member for limiting the range of swinging movement of said handle member to thereby define a horizontal position and an upright position of both said front and rear supporting arms; and a handle holder provided on said manipulation frame for holding said handle member detached from said link mechanism, said handle member serving, when held in said handle holder, as a means whereby an operator can move said loader.

2. A loader as claimed in claim 1, wherein said front wheel supporting arm is pivotally mounted on said cargo receiving frame at its front end so that said front wheel may be projected forwardly of the front end of said cargo receiving frame.

3. A loader as claimed in claim 1, wherein said front wheel supporting arm is pivotally mounted on said cargo receiving frame at a location spaced inwardly from the front end of the latter so that said front wheel may not be projected outward from the front end of said cargo receiving frame.

4. A loader as claimed in claim 1, further comprising a tilting mechanism adapted to hold said loader body at such an inclination that the front end of said cargo receiving frame is maintained at a level higher than that of the rear end thereof when said loader body is in the raised position.

5. A loader as claimed in claim 4, wherein the distance between the axis of rotation of said front wheel and the axis at which said front wheel supporting arm is rotatably connected to said cargo receiving frame is selected to be greater than the distance between the axis of rotation of said rear wheel and the axis at which said rear wheel supporting arm is rotatably connected to said manipulation frame.

6. A loader as claimed in claim 1, wherein said cargo receiving frame is made of a channel member having a substantially inversed U-shape with its lower side opened, and has a flat upper cargo receiving surface.

7. A loader as claimed in claim 1, wherein said manipulation frame has a flat pallet-contacting surface standing substantially upright from said flat cargo receiving surface of said cargo receiving frame.

8. A loader as claimed in claim 1, wherein said front wheel supporting arm has an inversed S-shape and provided at its intermediate portion with a narrowed portion.

* * * * *